UNITED STATES PATENT OFFICE 2,323,432

ALUMINUM HYDROXIDE POWDER AND PROCESS OF PREPARING THE SAME

Bruce Walton, Glenbrook, Conn., assignor, by mesne assignments, to Sterling Drug Inc., Wilmington, Del., a corporation of Delaware No Drawing. Application February 4, 1941, Serial No. 377,336

6 Claims. (Cl. 252—317)

Aluminum hydroxide powders previously described in the art all possess at least one of two disadvantages, i. e. they are either deficient in acid neutralizing power or they are so bulky that they are difficult to handle in practice.

I have now discovered a method by which it is possible to prepare a dry aluminum hydroxide powder which overcomes the above objections and yields a product which is characterized by high neutralizing power and low bulk. In preparing my new product, I first form an emulsion of the ordinary aluminum hydroxide gel in a water-insoluble viscous oil. I then remove substantially all of the water from this emulsion by careful drying. The resulting dry product is a powder which has a typical powdery feel and slip. In bulk my dried powder possesses about the same volume as an equivalent amount of aluminum hydroxide powder per se. However, the neutralizing power of aluminum hydroxide gel per se appears to be practically entirely retained in my powder. I find that my powder neutralises acid somewhat more slowly than aluminum hydroxide gel per se, but in the ordinary use of such a powder this is an advantage.

The water-insoluble viscous oil which I prefer to use is a mineral oil of the white oil type. However, I can use with almost equal advantage vegetable oils, as for example olive oil, soya bean oil, cotton seed oil or cocoanut oil. I may also use as my viscous oil a low melting fatty substance such as cocoa butter, tallow or beef fat, provided that the melting point of such substance is below the boiling point of water.

Ordinary aluminum hydroxide gel contains about 6–7% $Al(OH)_3$, the remainder being water.

In preparing my emulsions, I emulsify such a gel with my water-insoluble viscous oil. Emulsification should always be carried out at temperatures at which the viscous oily substance is in the fluid state. The proportions used may vary, but I prefer to use an amount of oil which will give a final product containing about 2–15% oil, about 2% water, the balance being aluminum hydroxide. The emulsion is preferably dried under a vacuum at from 30–75° C. My preferred drying temperature is about 45° C. The powders obtained are non-greasy, easy to grind and possess a very high neutralizing power.

The following specific example illustrates my invention but the invention is not limited to the example:

140 grams of aluminum hydroxide gel and 10 grams of white oil are emulsified in a high speed mixer. The emulsion is heated in a vacuum drier at 45° C. until the water content of the mixture is reduced to about 2%. The resulting product, if desired, may be ground before using.

I claim:

1. Procedure for preparing aluminum hydroxide powder of high neutralizing power and low bulk which comprises the steps of emulsifying aluminum hydroxide gel in a relatively small quantity of a water-insoluble viscous oil at a temperature at which such oil is fluid and then converting such emulsion into a substantially anhydrous powder by vacuum drying it at a temperature of about 45° C. but below approximately 75° C.

2. Procedure as defined by claim 1 in which the resultant powder contains about 2–15% of the following:

| Mineral oil | Cocoanut oil |
| Olive oil | Cocoa butter |
| Soya bean oil | Tallow |
| Cottonseed oil | Beef fat |

3. Procedure as defined by claim 1 in which the amounts of aluminum hydroxide gel and oil are in the relative proportions of about 14 to 1, in which emulsification is carried out by means of a high speed mixing machine and in which the drying is continued until the water content of the product is reduced to not more than approximately 2%.

4. As a new article of commerce, a non-greasy, easy to grind substantially anhydrous aluminum hydroxide powder composed of approximately 2%–15% of a water-insoluble viscous oil and the remainder substantially all aluminum hydroxide and characterized by a high but relatively slow-acting antacid power.

5. As a new article of commerce, a substantially anhydrous aluminum hydroxide powder produced in accordance with the procedure defined by claim 1 and composed of approximately 2–15% of water-insoluble viscous oil and the balance substantially all aluminum hydroxide, said powder being characterized by being non-greasy and easy to grind and by possessing a high acid neutralizing power as compared with the gel from which is was prepared.

6. As a new article of commerce, a dehydrated emulsion of aluminum hydroxide and mineral oil in the form of a non-greasy, easy-to-grind powder having a neutralizing power comparable to the gel from which it was prepared and of which the mineral oil constitutes about 2%–15%.

BRUCE WALTON.